United States Patent [19]

Abnett et al.

[11] 4,325,128

[45] Apr. 13, 1982

[54] CIRCUIT FOR MEASURING THE HORSEPOWER PER CYLINDER FOR AN ENGINE

[76] Inventors: Albert C. Abnett, 104 Kimothy Dr., Westerville, Ohio 43081; Mark E. Towns, 1420 Inglis Ave., Columbus, Ohio 43212

[21] Appl. No.: 33,881

[22] Filed: Apr. 27, 1979

[51] Int. Cl.³ .................. G06F 15/20; G01M 15/00
[52] U.S. Cl. ............................ 364/511; 73/112; 73/116; 364/551
[58] Field of Search ............ 364/431, 511, 551; 73/112, 115, 116, 117.2, 117.3, 117.4

[56] References Cited

U.S. PATENT DOCUMENTS

| | | | |
|---|---|---|---|
| 3,283,569 | 11/1966 | King et al. | 364/511 X |
| 3,287,965 | 11/1966 | Brahm et al. | 364/511 X |
| 3,986,009 | 10/1976 | Fastaia | 364/511 X |
| 4,064,747 | 12/1977 | Rackliffe et al. | 73/116 |
| 4,104,907 | 8/1978 | Tsipouras | 73/117.3 |

*Primary Examiner*—Jerry Smith
*Attorney, Agent, or Firm*—Anthony D. Cennamo

[57] ABSTRACT

A measuring and processing electronic circuit for measuring and visually displaying digitally the horsepower per cylinder selected for a reciprocating engine. Proximity sensors relate the rotation of cylinder by way of the fly-wheel and the crank shaft, to r.p.m. of the engine, and instantaneous position of the cylinder in the stroke. There is also provided a representative pulse for each degree through 360° of the revolution of the flywheel. A pressure transducer is mechanically linked to each cylinder in the engine. A selector switch selects which cylinder's horsepower is to be measured. In arriving at horsepower per cylinder the pressure measurement is multiplied against a volume signal for each degree through the revolution. The resultants for each degree are summed and multiplied against r.p.m. measurement for horsepower per cylinder.

8 Claims, 3 Drawing Figures

CIRCUIT FOR MEASURING THE HORSEPOWER PER CYLINDER FOR AN ENGINE

BACKGROUND

There are several prior art systems utilizing various means for determining the horsepower of an engine. These prior systems take into consideration in one way or another the speed of the engine, the pressure and volume displacement of the cylinder.

These prior art systems suffer attendant disadvantages primarily through the inability to accurately measure the pressure and the use of planimeters, or the like, for the non-sinusoidal cylinder displacement.

Further, the prior systems are concerned with the efficiency of the entire engine in contrast to each cylinder—primarily because of their inability to measure the pressure in each cylinder.

OBJECTS

Accordingly, it is a principal object of the present invention to provide a completely computerized electronic horsepower measuring system for a reciprocating engine.

It is a further object of the present invention to provide such a measuring system that measures and displays the horsepower of each cylinder as selected.

Other objects and features of the present invention will become apparent from the following detailed description when taken in conjunction with the drawings in which:

DETAILED DESCRIPTION OF DRAWINGS

Figure 1:
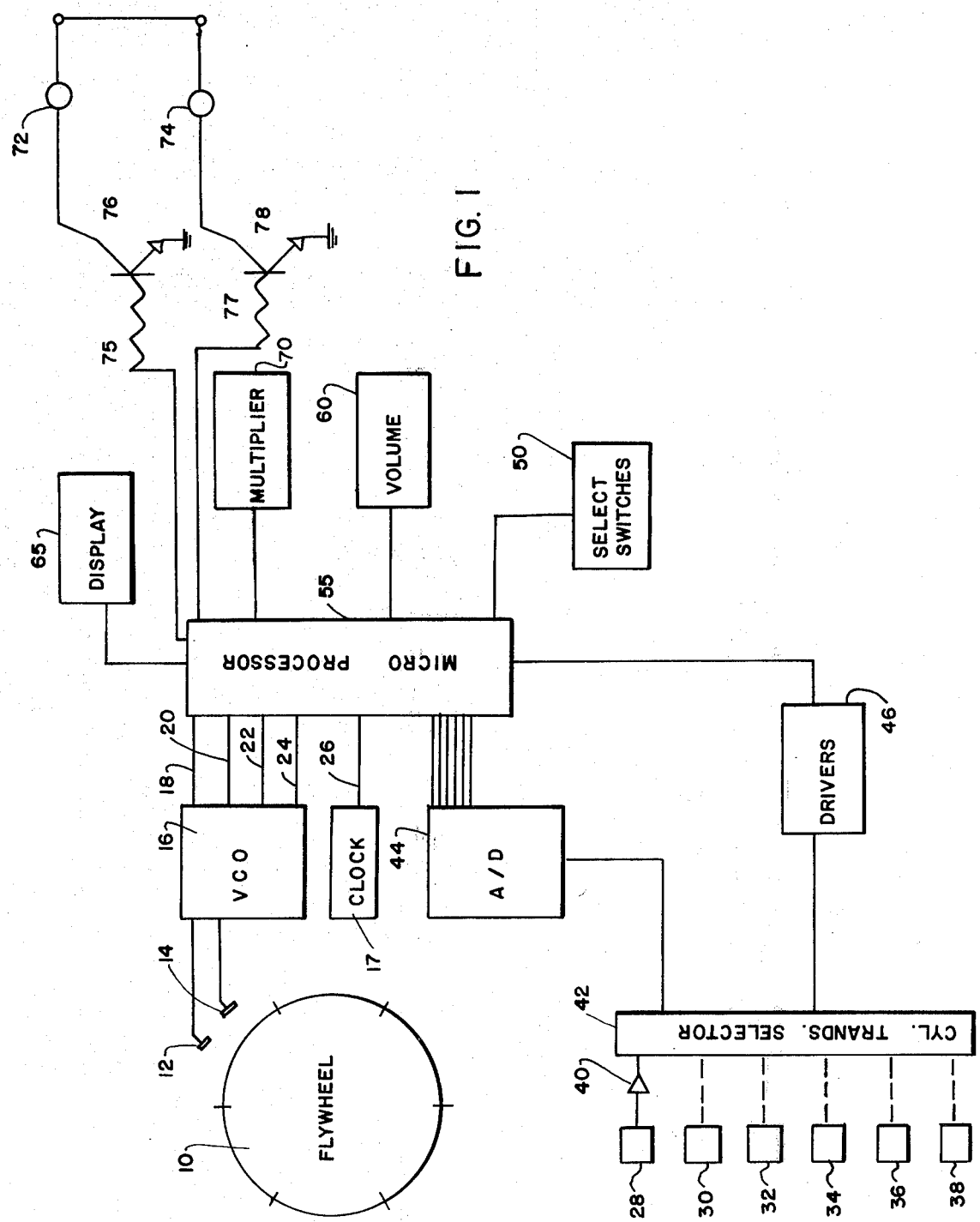
FIG. 1 is a block schematic illustration of the present invention in its preferred embodiment.

Referring now to FIG. 1 there is illustrated schematically in block the computerized horsepower per cylinder selected circuit in its simplified embodiment. The components per se of the system are within the state of the art except as combined to provide the intended function as set forth hereinafter. Positioned adjacent the flywheel 10 of the engine under evaluation is a pair of sensors 12 and 14. The first sensor 12 determines the top dead center of the crank shaft; whereas, the second sensor 14 determines the top dead center for each cylinder. In the embodiment shown, the first sensor 12 develops one indication per revolution of the flywheel whereas the sensor 14 develops six indications per revolution of the flywheel—one for each cylinder.

Specifically, the sensors 12 and 14 are not mechanically linked to the flywheel nor are they operative as non-contact light sensors. These sensors 12 and 14 are of the proximity non contact type, such as a capacitance or inductive probe adjacent the crank shaft. The preferred embodiment utilizes a magnetic sensor that senses the variation in the magnetic field as the flywheel rotates. As the crank shaft rotates, there is developed an output signal voltage from the sensors. The voltage becoming maximum upon the crank shaft reaching top dead center.

The outputs of sensors 12 and 14 are applied to the voltage controlled oscillator 16. This oscillator 16 is operative to develop a series of pulses in response to its input voltage. Specifically, the voltage controlled oscillator 16 develops a first series of pulses at output 18 representing each degree per revolution; that is, 360 pulses for each revolution of the flywheel 10. Next, there is developed six (6) pulses, at output 20, per one revolution of the flywheel 10. One of each of the six pulses representing top-dead center for each cylinder. There also is developed at output 22 of the voltage controlled oscillator 16 a one pulse per revolution of the flywheel 10. Finally, the voltage controlled oscillator 16 develops, at output 24, a 60 pulses series per one revolution of the flywheel 10. Each of the pulse outputs at 18, 20, 22, and 24 will be utilized in the microprocessor 55 as described hereinafter.

To provide an input signal representing speed, that is, revolutions per minute, the generated 60 pulses per revolution at output 24 are utilized with the clock 17 output of one second marker pulses at 26. To indicate r.p.m., the number of pulses from output 24 appearing between each one second marker pulse at 26 are counted. This is a direct indication of the revolutions per minute of the flywheel 10 which in turn is directly related to speed.

Departing, for the moment, reference is made to the six transducer pressure sensors 28, 30, 32, 34, 36, and 38. One of each of these six transducers is directly connected to each of the six cylinders of the engine. In certain types of extremely large stationary type of reciprocating engines, there is provided a pressure valve for each cylinder. The six pressure transducers are connected one to each of the respective valves on the six cylinders.

In the preferred embodiment the pressure transducers are not per se a part of the invention. However, they are specially designed for high pressure and temperature.

As aforesaid, the circuit of the present invention is a horsepower per cylinder. Accordingly, the circuit measures each cylinder individually. In this way only one of the six cylinder pressure transducers 28, 30, 32, 34, 36, and 38 are being utilized at one time. Accordingly, these six transducers are connected through pre-amplifiers such as 40, to the engine selector 42.

The particular cylinder to be evaluated is selected by selector switch 50. The selector switch 50 is a manual operation. It can be appreciated, that if so desired, the selection can be programmed for automatic selection or sequencing of the pressure transducers for individual cylinder evaluation.

Each cylinder transducer 28 through 38 is rendered operative or inoperative, upon selection, by a complimentary series of shut-off valves driven by relay drivers 46.

The voltage output of the operative pressure transducer is converted to a digital signal by the analog/digital converter 44. This digital signal is in turn applied to the microprocessor 55.

In operation of the circuit for measuring each cylinder horsepower, the microprocessor 55 provides the solution to pressure times volume, times r.p.m., times a constant. The constant serves to provide an indication that is proportional to pounds per square inch. For a particular cylinder selected the pressure is measured throughout the 360° of the fly-wheel—one full revolution of the cylinder. The one revolution signal, provided at output 22 from the oscillator 16, is applied to the microprocessor 55. The one revolution is indicated by the particular cylinders corresponding cylinder pulse at output 20. The one pulse of the six representing that particular cylinder dictates the function of the microprocessor 55, and the function continues for 360° of the flywheel. That is, until it rotates to the indicating position.

Figure 2A:
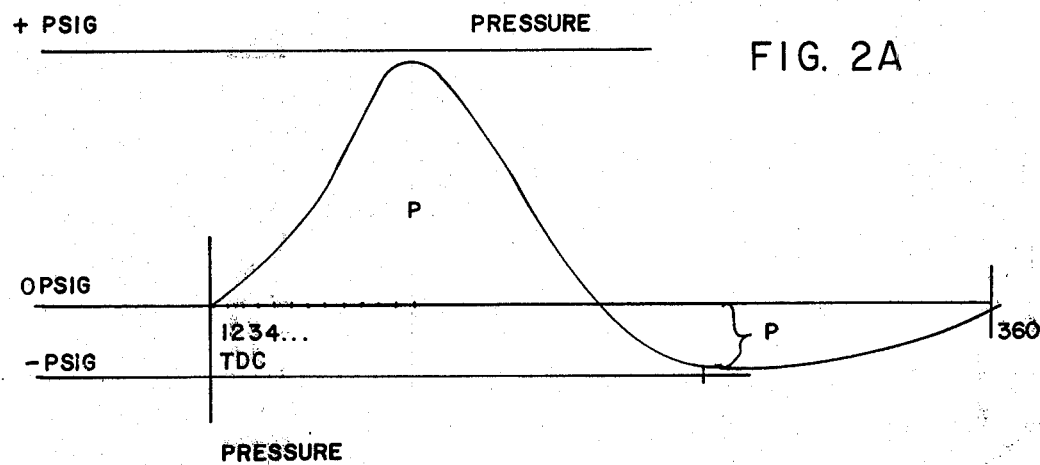
FIGS. 2A and 2B are graphical waveforms to better illustrate the function of the system.
Figure 2B:
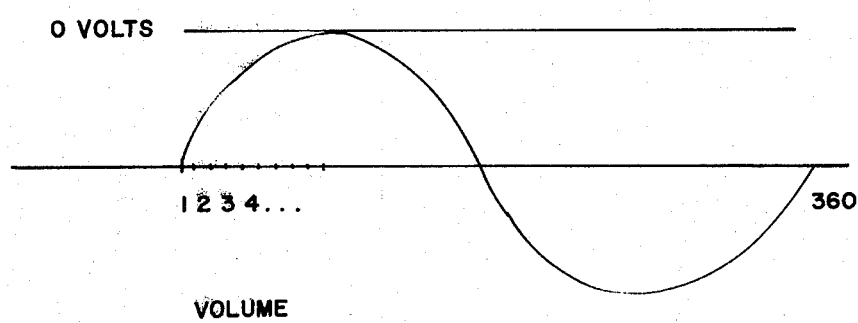

The pressure measurement from the A/D converter 44 and the r.p.m. signal from the clock reading at output 26 of clock 17 are multiplied with the volume signal from volume circuit 60. The measurement is taken for eight revolutions and then averaged by dividing by eight. With reference to FIGS. 2A and 2B there is illustrated a pair of graphs. FIG. 2A graphically depicts the actual pressure measurement per each degree, for 360°, of the stroke of the cylinder going through one complete cycle. As known in the art, the stroke of the cylinder arm is not linear. And, accordingly, there is not a sine-wave output. The graph of FIG. 2A is a typical measured pressure waveform.

FIG. 2B graphically depicts the volume standard voltage per each degree, for 360°, of the stroke of the cylinder. The volume standard voltage is calculated from the mechanical dimensions of the engine. Volume is stored for each degree of crankshaft stroke.

The microprocessor 55 in computing the horsepower per cylinder multiplies the actual measurement signal with the computerized volume signal for each degree through 360°. The 360° multiplied resultants are added and in turn multiplied with aforementioned r.p.m. signal. This result when multiplied against a constant represents horsepower for that particular cylinder.

The horsepower measurement for each cylinder is digitally displayed on the display 65. Again, this measurement display may also include a print-out or the measurement may be stored and later compared or printed out as deemed by the requirement. Other measurements such as r.p.m. may also be displayed.

The circuit comprising transistors 76 and 78 and their associated circuitry 75 and 77 and indicators 72 and 74 provide an indication when the aforementioned circuit is operating at excessive temperatures.

Although a certain and specific embodiment is illustrated it can be appreciated that departures may be had within the scope of the invention.

We claim:

1. A circuit for measuring the horsepower per cylinder of a reciprocating engine comprising:
   a pair of sensors positioned adjacent the flywheel of said engine, the first of said sensors responding once per revolution of said cylinder, and said second of said sensors responding once for each cylinder in one revolution;
   a pulse forming generator having the outputs of said sensors connected thereto and operative to provide 360 pulses for each degree per revolution, six pulses each representing one revolution per cylinder, one pulse per revolution representing dead center, and 60 pulses per revolution,
   a clock operative to provide time period pulses, and means for utilizing said time period with said 60 pulses per revolution for deriving a signal representative of the r.p.m. of said engine;
   a pressure transducer mechanically connected to each of said cylinders of said engine;
   a selector switch for selecting the cylinder pressure transducer to be measured,
   said transducers together with said six pulses operative to provide a voltage signal representing that particular cylinder;
   a volume signal and means for multiplying said pressure measurement against said volume signal for each degree of rotation of said cylinder and for summing the resultants thereof, and
   means for multiplying said summed resultants with said r.p.m. signal;
   display means for displaying the horse power for each cylinder.

2. The cylinder horsepower measuring circuit of claim 1 wherein said sensors are non-contacting with said flywheel.

3. The cylinder horsepower measuring circuit of claim 1 wherein said pulse forming circuit includes a voltage controlled oscillator.

4. The cylinder horsepower measuring circuit of claim 1 wherein said time period pulses are one second pulses.

5. The cylinder horsepower measuring circuit of claim 1 wherein said selector switch further comprises relay drivers and pressure valves.

6. The cylinder horsepower measuring circuit of claim 1 further comprises a temperature overload detecting system.

7. The cylinder horsepower measuring circuit of claim 1 wherein said display relates to the cylinder under measurement.

8. The cylinder horsepower measuring circuit of claim 7 wherein said display is a digital display.

* * * * *